United States Patent [19]
Siebert

[11] 3,871,721

[45] Mar. 18, 1975

[54] PRE-LOADED HYDROSTATIC WAY BEARING

[75] Inventor: William R. Siebert, Ford du Lac, Wis.

[73] Assignee: Giddings & Lewis, Inc., Ford du Lac, Wis.

[22] Filed: Aug. 13, 1973

[21] Appl. No.: 387,916

Related U.S. Application Data

[62] Division of Ser. No. 241,724, April 6, 1972, Pat. No. 3,772,961.

[52] U.S. Cl. ............................ 308/5, 308/9, 308/122
[51] Int. Cl. ................................................ F16c 17/00
[58] Field of Search .................... 308/5, 9, 122, 3 A

[56] References Cited
UNITED STATES PATENTS

| | | | |
|---|---|---|---|
| 2,440,919 | 5/1948 | Shaw | 308/9 |
| 3,384,425 | 5/1968 | Brown | 308/5 L |
| 3,395,947 | 8/1968 | Brown | 308/5 R |
| 3,456,993 | 7/1969 | Muller | 308/9 |
| 3,619,013 | 11/1971 | Jones | 308/5 R |
| 3,658,393 | 4/1972 | Luthi | 308/9 |

Primary Examiner—Charles J. Myhre
Assistant Examiner—R. H. Lazarus
Attorney, Agent, or Firm—Wolfe, Hubbard, Leydig, Voit & Osann, Ltd.

[57] ABSTRACT

Preloaded hydrostatic way bearing for use with a work carrying table for machine tools and the like to slidably support the table's platen on its base and for providing precise indexing and rotation of the platen. Two of the hydrostatic bearings individually comprise a gib structure with a bearing surface situated between a way mounted on the platen and preload actuators recessed in one of oppositely extending arms of a pie-shaped preload member mounted on the base. Each pre-load actuator comprises a flexible bladder with an internal slot defining a pressure chamber and which may include a rigid core plate held within the slot, preloading being accomplished by pressurized hydraulic fluid pumped into the pressure chamber formed between the bladder and at least one side of the core plate. Manifolds are provided to direct the pressurized hydraulic fluid to the hydrostatic bearings and the actuators.

3 Claims, 9 Drawing Figures

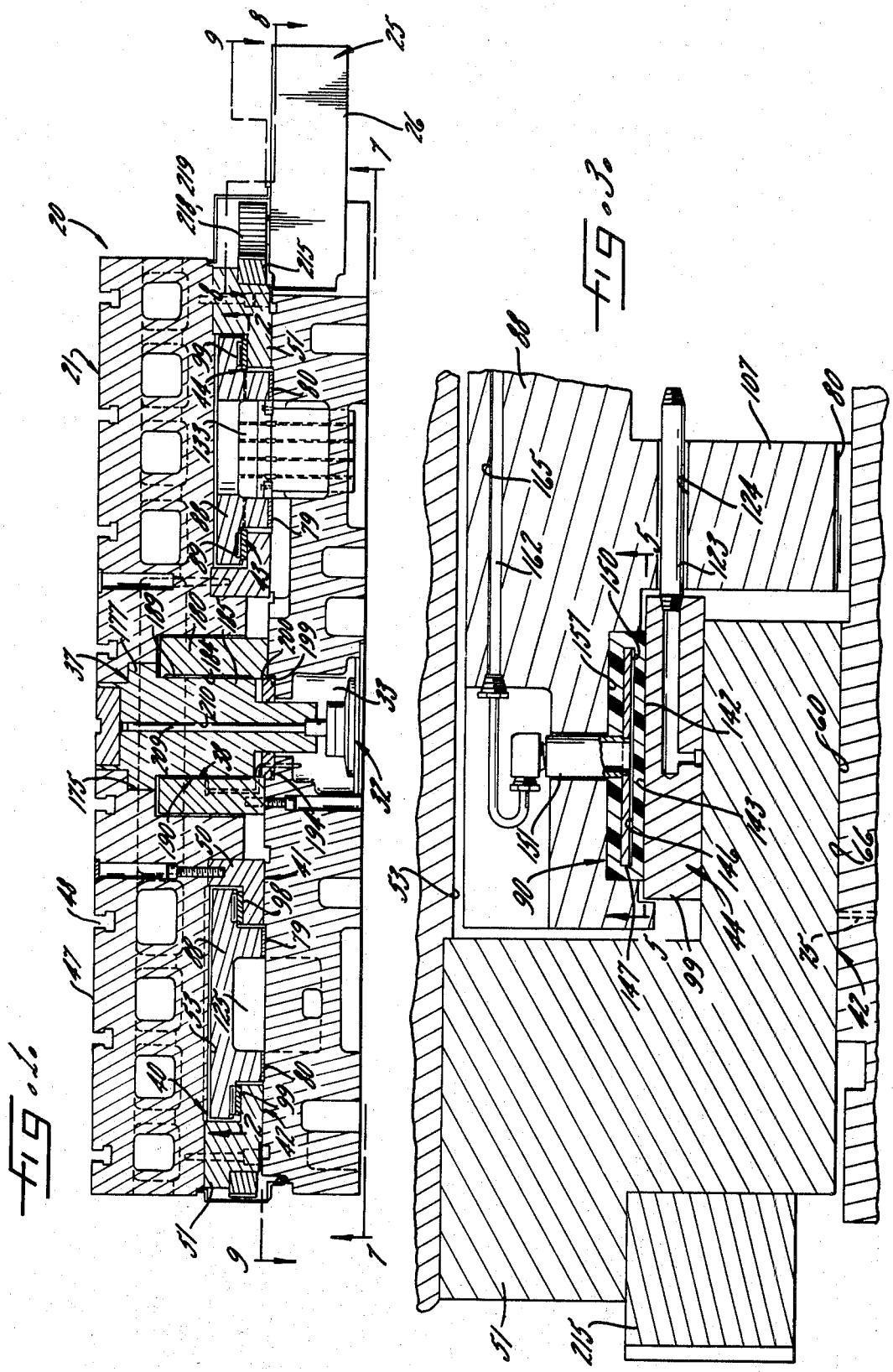

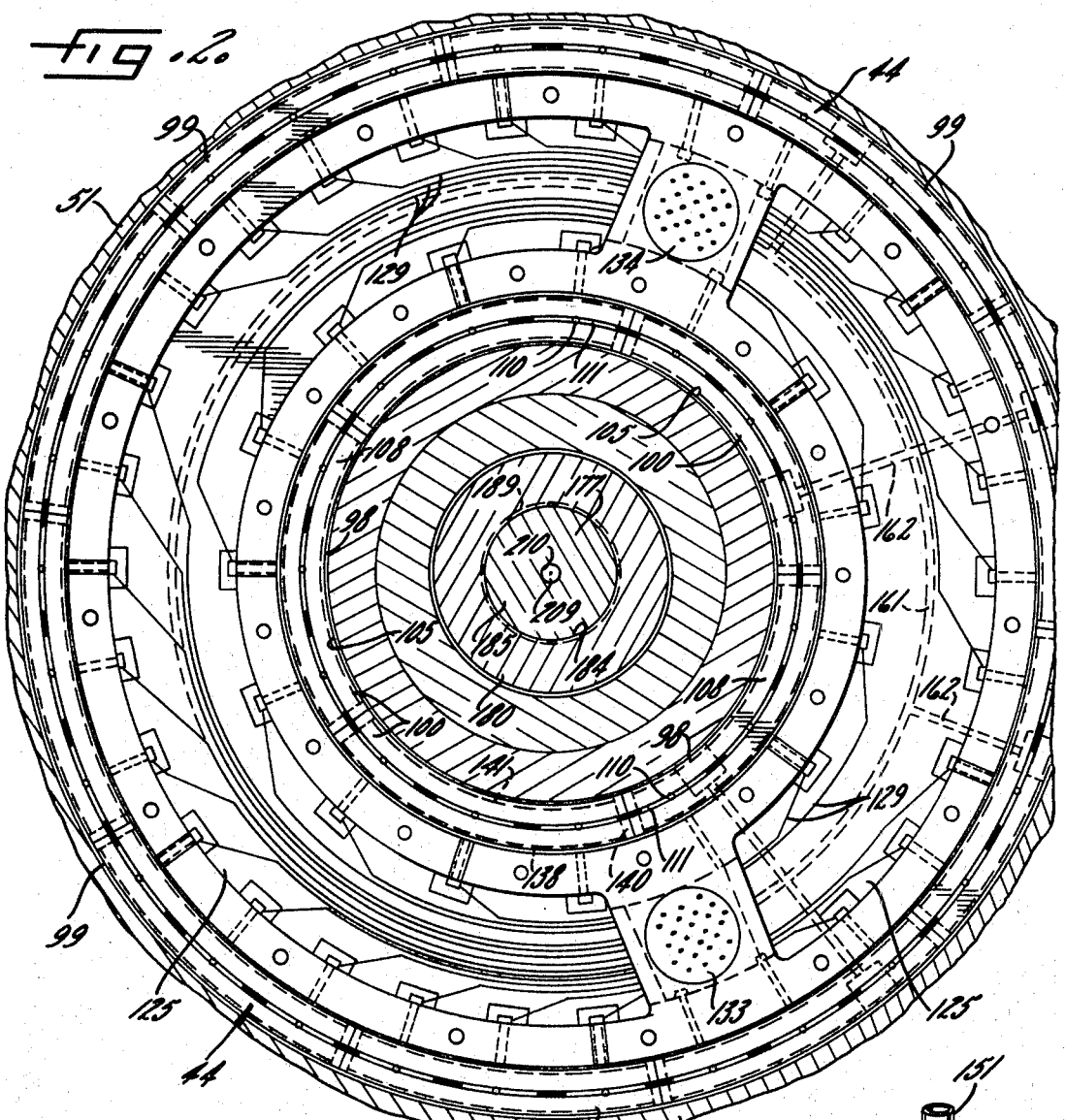

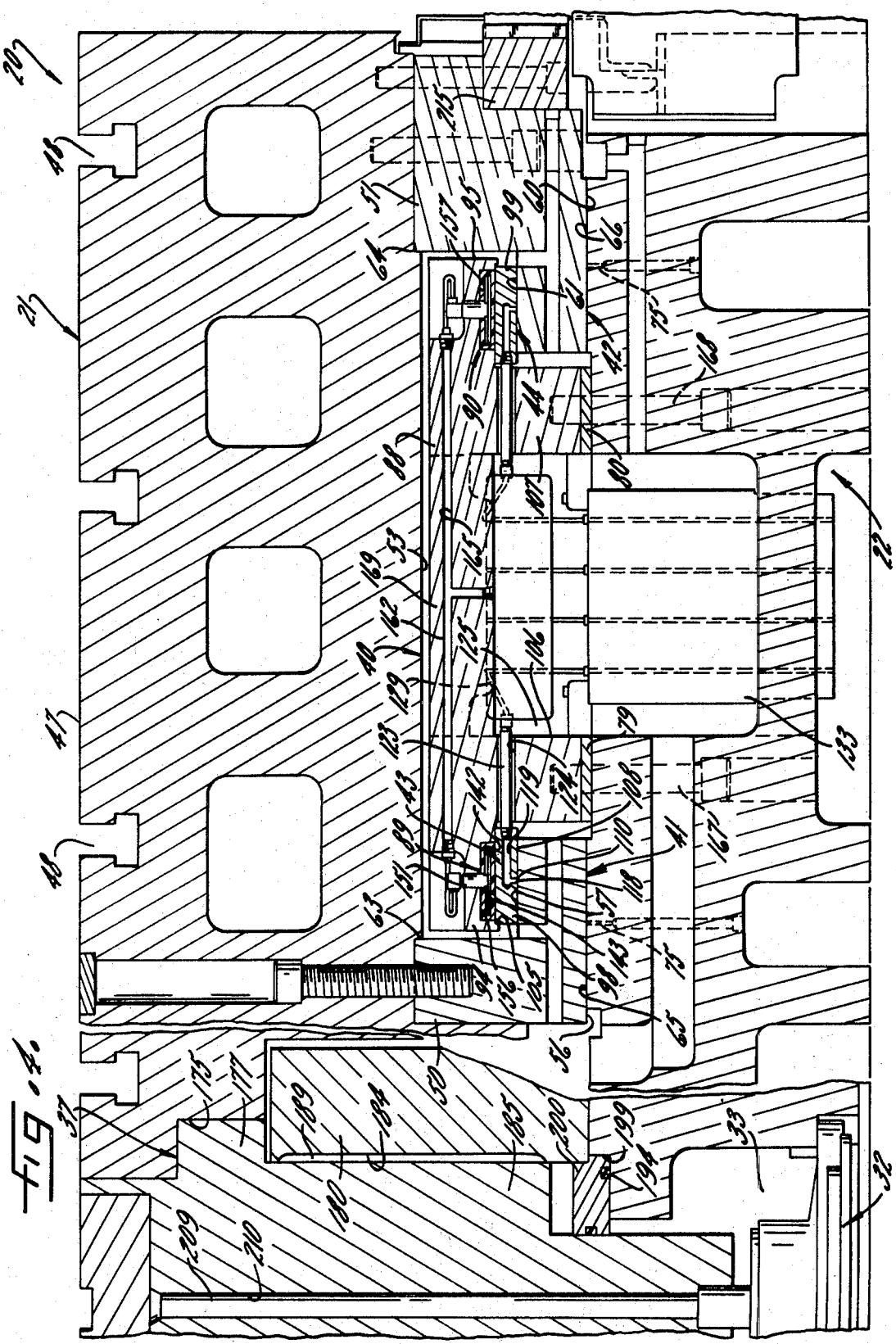

Fig. 7

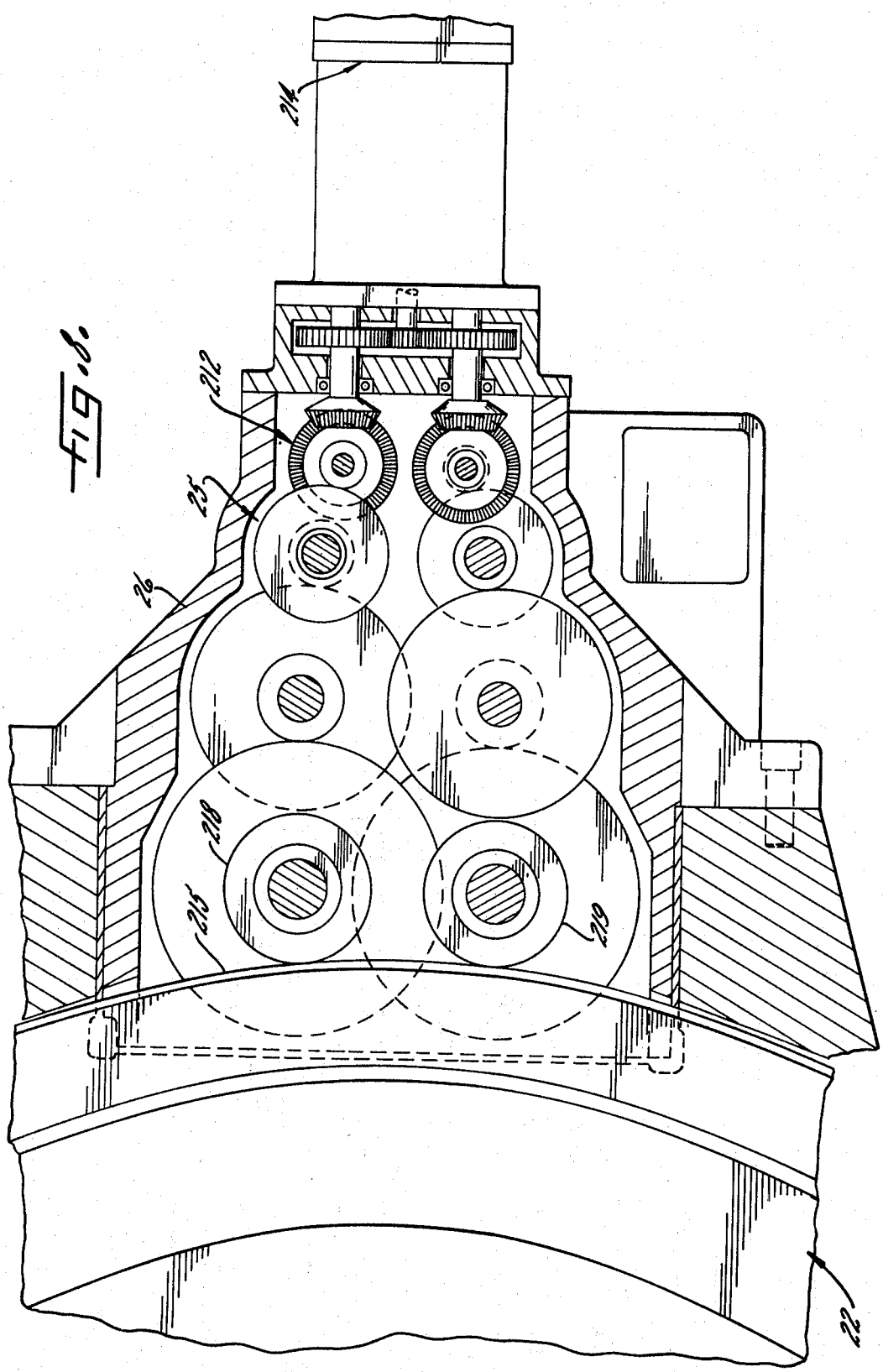

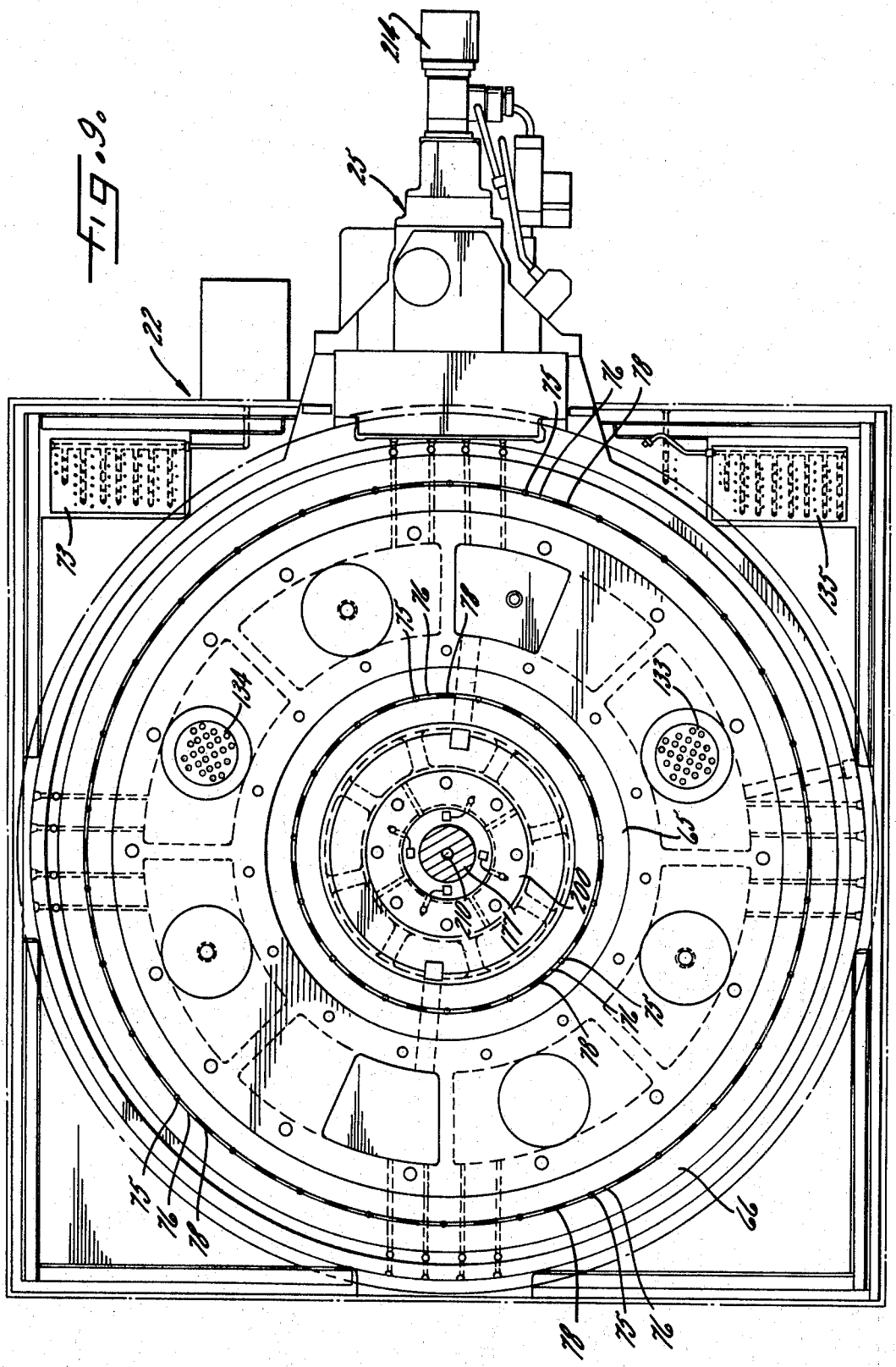

PRE-LOADED HYDROSTATIC WAY BEARING

DESCRIPTION OF THE INVENTION

This invention relates generally to work carrying tables for machine tools and, more specifically, to improved preloaded hydrostatic way bearings for work carrying tables.

Work carrying tables with preloaded hydrostatic bearings have been advantageously used for many years. Hydrostatic bearings reduce wear and thus preserve the precision of the bearings without the need for manually adjustable gibs. By the application of a biasing force to the hydrostatic bearings, distortion of the bearing structures and the table platen under heavy loads is significantly reduced and the indexing accuracy of the table is increased by the resulting stiffness of the bearing.

However, in certain prior work carrying tables, particularly those which carry heavy workpieces, the large preload biasing forces applied to the hydrostatic bearings often create force couples within the bearing structure which can cause their own distortion of the platen surface. It has also been difficult in certain prior tables to maintain the preload forces uniform along the length of the bearing structures with the result that the benefits of preloaded hydrostatic bearings are reduced and there is resultant distortion of the platen surface by heavy workpieces.

One object of the present invention is to provide a work carrying table having preloaded hydrostatic bearings for accurate indexing of the table and in which the preloading forces do not distort the surface of the table platen. A related object is to provide such a table which is also adapted for precision contour machining of workpieces supported on the rotating table platen.

A further important object of the invention is to provide a work carrying table having preloaded hydrostatic bearings in which the preload forces are uniform along the bearing structure. A related object of the invention is to provide a preloaded hydrostatic bearing structure for work carrying tables having a plurality of hydraulically operated bladder assemblies, each of which applies a uniform preload force to an underlying gib section of the bearing structure.

Other objects and advantages of the invention will become apparent as the following description proceeds, taken together with the accompanying drawings, wherein:

FIG. 1 is a vertical sectional view taken transversely through an illustrative rotary work table embodying the present invention:

FIG. 2 is a horizontal sectional view taken in the plane of the line 2—2 in FIG. 1;

FIG. 3 is an enlarged, broken vertical sectional view illustrating a supporting and a preload hydrostatic bearing incorporated in the rotary table of FIG. 1; FIG. 4 is an enlarged, broken vertical sectional view illustrating the preload assembly incorporated in the rotary work table of FIG. 1;

FIG. 5 is an enlarged broken horizontal sectional view of a preload actuator taken in the plane of the line 5—5 of FIG. 4;

FIG. 6 is an enlarged, horizontal plan view of the preload actuator of FIG. 5;

FIG. 7 is a horizontal plan view taken in the plane of the line 7—7 in FIG. 1 illustrating the bottom of the table base;

FIG. 8 is a broken horizontal sectional view taken in the plane of the line 8—8 in FIG. 1 illustrating the gear drive of the table;

FIG. 9 is a broken horizontal sectional view taken in the plane of the line 9—9 in FIG. 1 illustrating the top of the table base.

Wile the invention is susceptible of various modifications and alternative constructions, certain illustrative embodiments have been shown in the drawings and will be described below in considerable detail. It should be understood, however, that there is no intention to limit the invention to the specific forms disclosed but, on the contrary, the intention is to cover all modifications, alternative constructions, and equivalents falling within the spirit and scope of the invention.

Referring more particularly to FIG. 1, the invention is there exemplified in a rotary work table 20 which may be used to support and rotate a workpiece relative to the tool spindle of a machine tool such as a horizontal boring, drilling and milling machine (not shown). The rotary table comprises a work table or platen 21 pivotally supported upon a base member 22 which, in turn, may be mounted on or adjacent the machine tool in any suitable manner. For indexing the platen 2 to a chosen position or rotating it to perform a contour machining operation on a workpiece mounted thereon. the work table is provided with a preloaded table drive 25 mounted within a gear box 26 projecting radially of the base 22. For detecting the position of the platen 21, there is included a rotary transducer 32 mounted in a recess 33 in the base of the table. The transducer 32 may be of a well known type such, for example, as one known in the trade as an "Inductosyn" unit. A hub assembly 37, including hydrostatic bearing 38, centers the platen on the base for sliding rotation of supporting outer hydrostatic bearings 41, 42. The outer bearings 41, 42 are preloaded by a preload hydrostatic bearing assembly 40 comprising preload hydrostatic bearings 43, 44 which coact respectively with the bearings 41, 42.

The platen has a flat finished upper surface 47 formed with a plurality of spaced apart inverted T-slots 48. Clamps engaging the slots 48 are applied to a workpiece in a well known manner for holding the same on the upper surface 47 of the platen for machining with the platen either locked in an indexed position or free to rotate the workpiece relative to the tool spindle. Two annular ways 50, 51 are mounted on the bottom surface 53 of the platen. Referring to FIG. 4, the inner way 50, which in the case happens to be of generally L-shaped cross section, has been machined and scraped to present a relatively broad supported bearing surface 56 and a narrower preload bearing surface 57; likewise, the outer way 51 which in this case happens to be of generally Z-shaped cross section, has been machined and scraped to present a relatively broad supported bearing surface 60 and a narrower preload bearing surface 61. In the present instance, the annular ways are each of unitary construction and are piloted concentrically with respect to the hub assembly 37 by shoulders 63, 64 formed on the bottom surface 53 of the platen.

Figure 7:
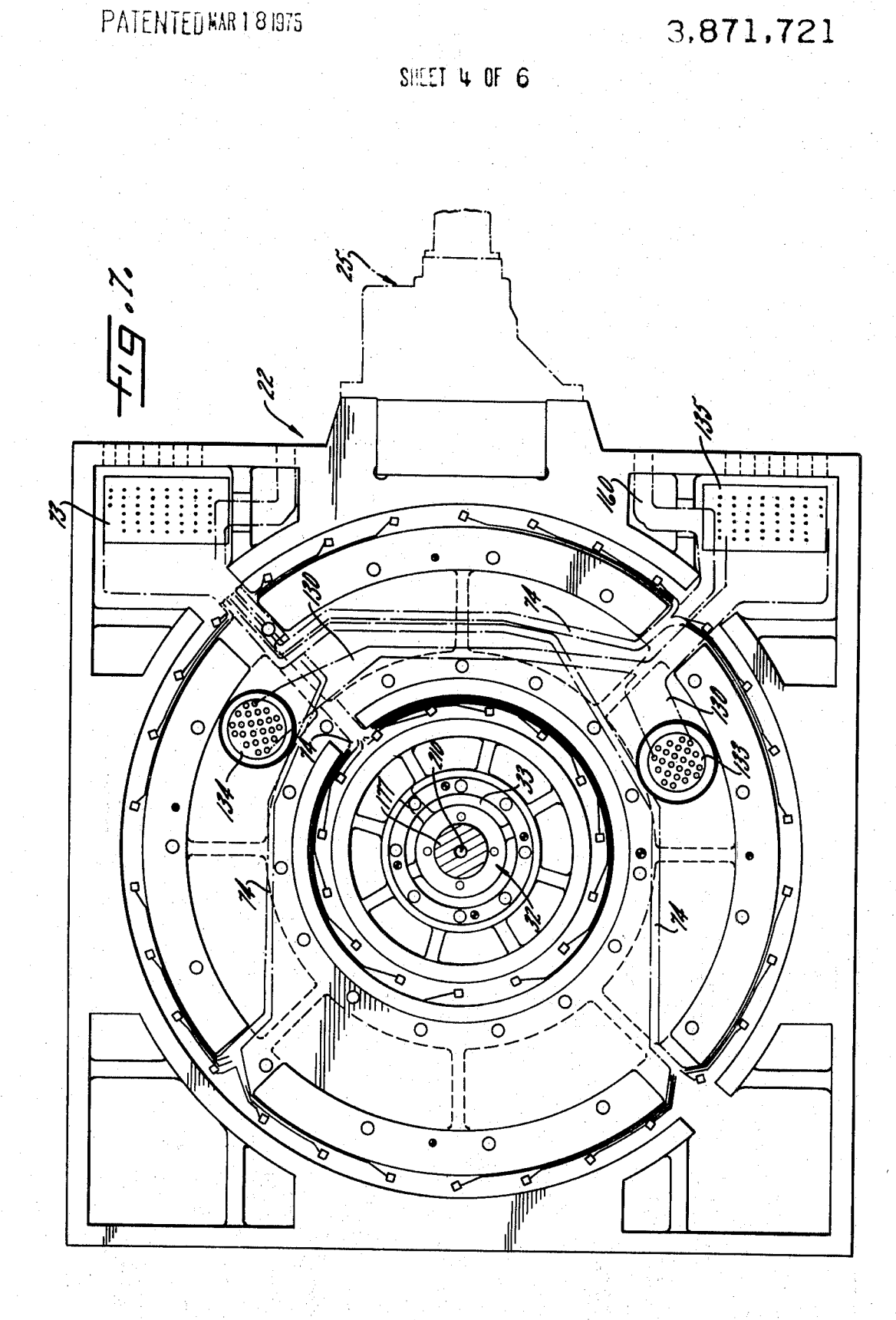

The base 22 is formed with two annular supporting bearing surfaces 65, 66 in direct facial alignment with the supporting bearing surfaces 56, 61 respectively of the annular ways 50, 51 to form the supporting hydrostatic bearings 41, 42 wherein each supported bearing surface is slidably engaged by its respective supporting bearing surface through a film of pressurized oil (FIGS. 1 and 4). To complete the hydrostatic bearings 41, 42, pressurized oil approximately 300 psi. is supplied from 1,000 psi. source, via capillary restrictors (not detailed) mounted on manifold 73 and via conduits 74 to a series of spaced ports 75 along each supporting bearing surface 65, 66 of the base and distributed by means of pads or grooves 76 extending from each port 75 (FIGS. 7 and 9). Between the grooves spaced circularly about the annular supporting bearing surfaces 65, 66 is an epoxy resin dam 78 which is flush with the bearing surface. The ports 75 and grooves 76 are of small diameter relative to the width of their associated bearing surfaces 65, 66; because of this and the restrictors, the flow of oil to the supporting bearing surfaces is regulated to insure the desired hydrostatic bearing function. The maximum pressure at the ports and grooves decreases more or less linearly from the ports and grooves to the edges of the bearing surfaces where relief passages, such as the series of radial drain channels 79, 80 (FIG. 1) are provided to carry off exhaust oil to a sump in the base 22 (not shown).

Provision is made in the preload hydrostatic bearing assembly 40 for preloading the hydrostatic bearings to achieve accurate indexing and rotation of the platen 21 without distortion of the platen surface 47 (FIGS. 1, 3 and 4). This is accomplished by means of a preload member 88, which in the present instance is an annular ring or way of generally T-shaped cross section, secured to the table base concentrically with respect to the hub assembly 37, a pair of preload actuating means 89, 90 recessed respectively within one of the laterally extending arms 94, 95 of the preload member of annular way 88, and a pair of preload gibs 98, 99 situated respectively between the preload bearing surface 57 of the L-shaped inner way 50 and the actuating means 89 and between the preload bearing surface 61 of the Z-shaped outer way 51 and the actuating means 90.

Taking, as an example, the elements associated with the inner way 50, it will be noted that the preload gib 98 is fashioned of a plurality of arcuate gib sections 100 (FIG. 2) situated end to end to form an annular ring. Each gib section 100 is a flat bar laterally confined between a shoulder 105 of the arm 94 and a leg 106 of the annular ring 88. The clearance dimensions are such that the gib 98 is permitted to float vertically and laterally a slight amount. The lower face 108 of each gib section has been machine ground flat to act as a hydrostatic bearing surface and has appropriate ports 110 and grooves or pads 111 for distributing pressurized oil at approximately 380 psi. as previously described. Each gib section has a number of inter-connected vertical and lateral bores 118, 119 connecting each port 110 to a nipple 123 that extends through a bore 124 in the leg 106 into the annular cavity 125. Each nipple is connected to one of the conduits 129 which in turn is connected to a corresponding one of the conduits 130 by one of the cylindrical manifolds 133, 134 with the conduit 130 leading via a corresponding capillary restrictor (not detailed) in the capillary manifold 135 to the pressurized oil source.

A plurality of arcuate gib sections 100 (FIG. 2) are also operatively interconnected to form the preload gib 99 and connected to a pressurized oil source of approximately 1,000 psi. thru a capillary restrictor in the same manner as the gib sections of preload gib 98 to operate with the preload bearing surface 61 of the outer way 51 as the preload hydrostatic bearing 44.

The preload actuating means 89 (FIGS. 2, 4 and 5) which is operatively associated with the inner way 50 and the preload gib 98 to preload the hydrostatic bearing 41 is formed of a plurality of identical acutators 138 separated end to end by a plurality of cross-blocks 140 to form an annular ring. The preload actuating means 90 associated with outer way 51 and preload gib 99 is comprised of similar actuators and cross-blocks (FIGS. 2, 4 and 5). but in this case the actuators are formed with areas of slightly greater radius than those associated with the inner way 50.

Each actuator 138 (FIGS. 2, 3, 5, 6) in this instance, comprises an arcuate bladder 141 molded of a flexible, oil resistant material such as a high density urethane plastic and having a flat bottom surface 142 adapted to abut against top surface 143 of an associated gib section 100. Internally, the actuator 138 is formed with a relatively flat arcuate cavity 146 extending substantially the length and breadth of the actuator except for a peripheral wall. Molded within the cavity 146 is a rigid core plate 147 sealed on its top surface and its edges to the top and sides of the cavity, but free of the cavity on its bottom surface such that a thin pressure chamber 150 (slightly exaggerated in FIG. 3) exists between the bottom of the cavity 146 and the bottom of the core plate 147. Pressurized oil of approximately 200 psi. is delivered to the pressure chamber 150 through a conduit 151 that passes through the top of the bladder and is anchored by a leakproof connection in a port 152 in the core plate 147 so as to open into the pressure chamber.

The preload actuating means 89, 90 are respectively mounted within recesses 156, 157 in arms 94, 95 with substantially equal spacing between the core plates 147 and the boundaries of the recesses and are in contact with the top surfaces of the preload gibs 98, 99 with the ends of each gib section 100 preferably underlying a cross-block 140 (FIGS. 2- 4). The pressurized oil is provided to the preloading actuating means from a pressure source through a port in the base (not shown). Connecting this port to each of the actuator bladders 141 is a conduit 160 that is connected through the cylindrical manifold 133 to a supply conduit 161. The supply conduit extends through the cavity 125 and has branch conduits 162 that interconnect it through bores 165 in the annular ring 88 with the conduits 151 of the individual actuators 138 (FIGS. 2—4 and 7). Because of the relative orientations of the gibs 98, 99 and their respective actuating means 89, 90 and the uniform pressure provided to all the actuators 138 of the actuating means from a single pressure source, the actuating means will exert a constant, uniform preload force between the core plates and the gibs. The latter are free to float slightly, so that the preload forces on the preload hydrostatic bearings 43, 44 are uniform and the clearances in the bearings are substantially uniform even when the table is deflected under large unbalanced loads.

Another important advantage of this construction is that the preload forces exerted on the hydrostatic bearings 41, 43 and 42, 44 are not applied to the platen to distort its upper surface 47 (FIG. 4). The inner preload actuating means 89 exerts a compression force on the inner arm 94 and screws 167 or other means mounting the T-ring to the base exert a tension force on the leg 106. The combination of these forces results in a clockwise force couple being applied to the body 169 of the preload way or T-ring 88. On the other hand, the outer preload actuating means 90 exerts a compression force on the arm 95 and screws 168 or other means mounting the T-ring 88 to the base exert a tension force on the leg 107. The combination of these forces results in a counterclockwise force couple being applied to the body 169 of the T-ring 88. These two force couples, because they are in opposite directions, tend to cancel out. Furthermore, whatever slight distortion there is in the T-ring 88 is not transmitted to the platen because of the clearance provided between the ring and the platen that allows the ring to distort a slight amount without contacting the platen.

In an alternative construction of actuator 138, the bladder 141 may be formed with an arcuate cavity, such as cavity 146, through its center which acts as a pressure chamber in the manner of pressure chamber 150. The conduit 151 may then be anchored directly to the bladder, with the core plate 147 omitted. As a result, the preload force is exerted between the tops of the recesses 156, 157 and the gibs.

As noted earlier herein, the platen 21 is centered on the base 22 and held against radial motion by the hub assembly 37 (FIGS. 1 and 2). There is formed in the center of the platen a step bore 175 within which is fixedly secured a pivot post 177. An upstanding cylindrical hub 180 is fixedly attached to the base by a suitable means. The hub 180 has an inner bore 184, to receive a mating cylindrical portion 185 of the pivot post 177 and is formed with a series of hydrostatic pads 189 to provide hydrostatic bearing 38 between the cylindrical hub and pivot post which is machined to provide a hydrostatic bearing surface to allow frictionless rotation between the pivot post and the inner bore. Pressurized oil at approximately 500 psi. is supplied to each pad 189 by a conduit via a capillary restrictor (not detailed) in the capillary manifold 135 and is distributed through the hydrostatic bearing 38 as previously described. A sealing and pilot ring 194 is secured within a counterbore 199 of the base and held in place by an overlapping bottom edge 200 of the hub 180. Mounted in the bottom of the base and connected to the platen by a rod 209 fitted in a bore 210 in the hub is a transducer 32 for measuring the index position of the platen relative to the base.

The table drive 25 (FIG. 7) is a backlash-free, preloaded highly responsive drive similar to the invention of U.S. Pat. No. 2,946,232 to Gordon H. Jones and assigned to the assignee of the present application. The preloaded table drive comprises a pair of parallel reduction gear trains 212, 213 connecting the single drive motor 214 to the table ring gear 215 with each gear train preloaded to a predetermined amount of its maximum load. The output opinions 218, 219 of the parallel gear trains contact and drive the ring gear 215 in tandem. An advantageous feature of the table drive is the axial staggering of corresponding gears of the two gear trains so that the gear trains overlap to provide a very compact unit easily accommodated on the yoke 26 in a relatively small area.

Although the present invention is exemplified in a rotary table, it also finds utility in a work carrying table having a platen adapted for linear motion in a horizontal or vertical plane. This would involve certain changes in the shape of the bearing components to accommodate the desired platen motion.

What is claimed is:

1. In a preloaded hydrostatic way bearing for relatively slidable machine tool members, the combination comprising
   a. a supporting member having a supporting bearing surface;
   b. a supported member slidably carried on said supporting member, said supported member having both a supported hydrostatic bearing surface disposed in sliding engagement with said supporting bearing surface and a preload hydrostatic bearing surface;
   c. a plurality of hydraulic actuators held by said supporting member and linearly-spaced opposite said preload hydrostatic bearing surface; and
   d. a plurality of preload gibs, each preload gib having a hydrostatic bearing surface and being interposed between an associated actuator and said preload hydrostatic bearing surface with said gib's hydrostatic bearing surface disposed in sliding engagement with said preload hydrostatic bearing surface;
   e. each of said hydraulic actuators including
      a flexible bladder means and
      means defining a pressure chamber within said bladder means; a rigid core means disposed within said pressure chamber and
   f. means for supplying hydraulic pressure to said pressure chambers to cause said actuators to apply a uniform preload force via said gibs to said hydrostatic bearings.

2. A preloaded hydrostatic way bearing as claimed in claim 1 wherein said flexible bladder core means comprises a thin plate and said pressure chamber is defined between one surface of said plate and said bladder means.

3. A preloaded hydrostatic way bearing for relatively slidable machine tool members comprising, in combination,
   a. a supporting member having two laterally-spaced supporting bearing surfaces;
   b. a way fixed to said supporting member and having two oppositely extending arms;
   c. a supported member slidably carried on said supporting member, said supported member having two laterally-spaced supported hydrostatic bearing surfaces and two laterally-spaced preload hydrostatic bearing surfaces, each supported bearing surface being disposed in sliding engagement with a respective one of said supporting bearing surfaces and each preload bearing surface being disposed below a respective one of said arms;
   d. a plurality of actuators recessed in each of said arms and linearly-spaced opposite a respective preload bearing surface;
   e. a plurality of preload gibs, each preload gib having a hydrostatic bearing surface and being interposed between an associated hydraulic actuator and said actuator's respective preload bearing surface with said gib's bearing surface in sliding engagement with the respective preload bearing surface;
   f. each of said hydraulic actuators including
      a flexible bladder means and
      a thin core plate carried within said bladder means so as to define a pressure chamber between one surface of said plate and said bladder means; and
   g. means for supplying a uniform hydraulic pressure to said pressure chambers to cause said actuators to apply a uniform preload force via said gibs to said hydrostatic bearings.

* * * * *

PO-1050
(5/69)

UNITED STATES PATENT OFFICE
CERTIFICATE OF CORRECTION

Patent No. 3,871,721      Dated March 18, 1975

Inventor(s) William Siebert

It is certified that error appears in the above-identified patent and that said Letters Patent are hereby corrected as shown below:

Column 2, line 7, change "Wile" to --While--.

Column 2, line 24, change "2" to --21--.

Signed and Sealed this

*thirtieth* Day of *September 1975*

[SEAL]

*Attest:*

RUTH C. MASON
*Attesting Officer*

C. MARSHALL DANN
*Commissioner of Patents and Trademarks*